A. DOW.
DEMOUNTABLE TIRE RIM.
APPLICATION FILED JAN. 29, 1909.
922,404.
Patented May 18, 1909.
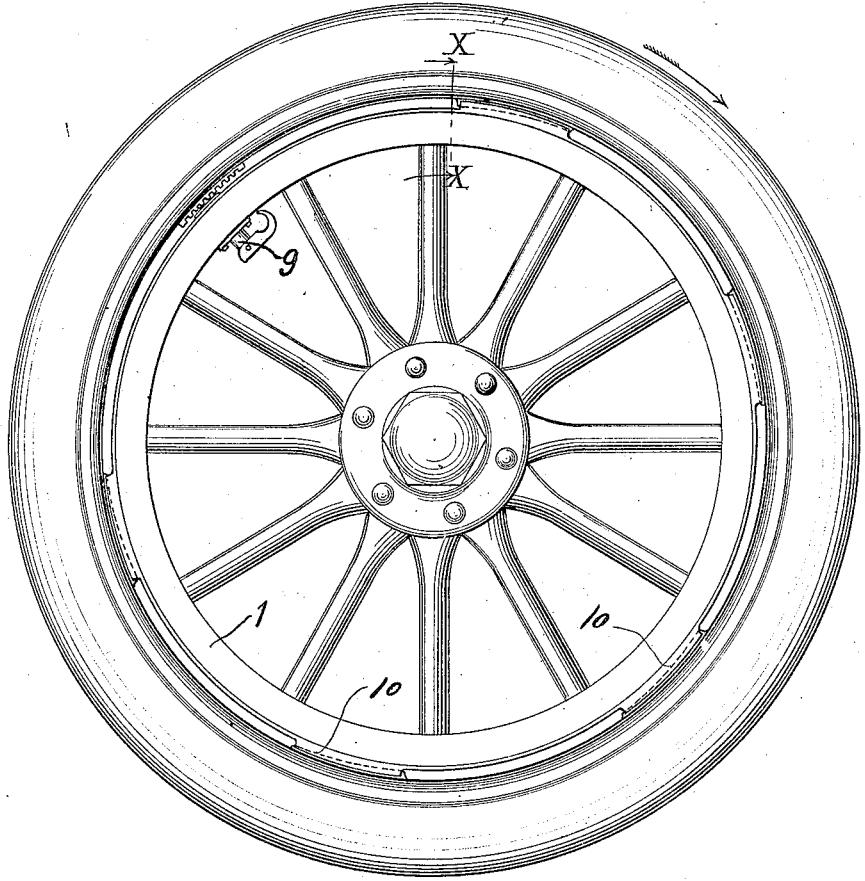
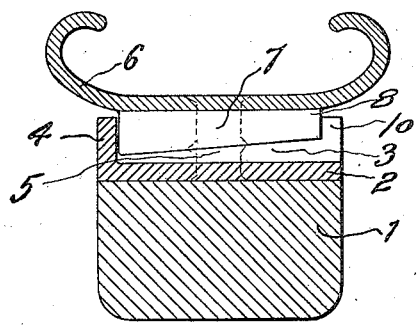

UNITED STATES PATENT OFFICE.

ALEXANDER DOW, OF NEW YORK, N. Y., ASSIGNOR TO DOW RIM COMPANY, A CORPORATION OF NEW YORK.

DEMOUNTABLE TIRE-RIM.

No. 922,404.          Specification of Letters Patent.          Patented May 18, 1909.

Application filed January 29, 1909. Serial No. 474,990.

*To all whom it may concern:*

Be it known that I, ALEXANDER DOW, a citizen of the United States of America, residing at New York city, county and State of New York, have invented certain new and useful Improvements in Demountable Tire-Rims, of which the following is a specification.

My invention relates to an improved construction in demountable tire rim and wheel felly whereby certain advantages, hereinafter set forth, are obtained.

More particularly, the invention is designed to be used in connection with a demountable tire rim and wheel felly of the style set forth in my co-pending application for United States Letters Patent, Serial No. 470,052, filed December 30, 1908.

In the invention of my aforesaid application the wedges or inclined surfaces on the tire rim and felly rim taper from a point at or near the inner side of the wheel to the outer surfaces of the felly and tire rims. These outside rim surfaces are ordinarily painted or enameled to present a neat appearance, and, where the wedges are constructed as above, the paint or enamel may become broken or rubbed off along the line of the joint between the tire and felly rims by careless handling of the tire rim in placing and changing tires.

To protect the finish of the outside rim surfaces and for the further purpose of strengthening the felly and tire rim joint, I have, in the present invention, provided a flange at the outside edge of the felly rim wedge; and the wedge on the felly rim, instead of being continued to the outside surface of that rim, is stopped at the inside surface of this flange. The wedge of the tire rim, when the tire is in place on the wheel, lies behind this flange on the felly so that the line of the joint between the wedges also lies behind the flange, instead of continuing to the outside surface of the wheel. Obviously, the flange is a strengthening element against lateral displacement of the tire rim. These and other objects of the invention will hereinafter more clearly appear in connection with the accompanying drawings, in which:

Figure 1 is a view in side elevation of the outside of a wheel with demountable tire rim assembled thereon, constructed according to the present invention. Fig. 2 is a view in cross-section through the demountable tire rim and wheel felly on the line X—X of Fig. 1.

Referring to the drawings, the wheel felly 1 is shown as having attached thereto a felly rim 2 on which, at intervals around the wheel, are wedges 3. These wedges, as shown in Fig. 1, are tapered circumferentially and radially, and, as shown in Fig. 2, are also tapered laterally from the base of a flange 4 on the felly rim outward and upward toward the outer surface of the wheel felly. The wedges 3 may be made integral with the felly rim 2, but are shown in Fig. 2, as riveted to the felly rim by rivets 5. The demountable tire rim 6 has riveted thereto, as by rivets 7, at intervals around the wheel, wedges 8. These wedges, as shown in Fig. 1, taper radially and conversely to the wedges 3 on the felly rim, and also taper laterally, as shown in Fig 2, so that the surfaces of the wedges 3 and 8 may engage each other at all points when the tire rim is in a locked position. The wedges 3 on the wheel felly are spaced far enough apart to permit the wedges 8 on the tire rim to be passed between them so that the tire rim may be pushed laterally on to and over the felly rim, whereupon the tire rim is given a circumferential movement, as described in my aforesaid application, to bring the wedges 3 and 8 into interlocking engagement. The rims are then locked against return circumferential movement by means of a bolt 9, more specifically described in my application filed in the United States Patent Office Jan. 29, 1909, No. 474,989, locking device for demountable tire rims.

As distinguished from the construction shown in my first named application, the wedges 3 on the wheel felly are provided with flanges 10, and the line of the joint between the wedges is stopped at the inside base of the flange 10, as shown in Fig. 2, instead of being continued to the outside surface of the felly. The outside surface of the felly rim therefore presents a smooth unbroken surface, and the paint or enamel thereon cannot be broken or rubbed off by the movement of the wedges over each other. The flanges 10, furthermore, have the function of strengthening the structure against lateral displacement of the tire rim, and to this end reinforce the lateral incline of the wedges.

Having set forth the objects and nature of my invention, what I claim and desire to secure by Letters Patent is:

1. In a wheel and demountable tire rim therefor, a fixed felly rim and a demountable rim carrying a tire, a vertical flange on the outside edge of one of the rims, a wedge on the rim with said flange inclined from a point below the top of the flange toward the inside face of the wheel, and a wedge on the other rim adapted to be moved by a relative circumferential movement of the two rims into engagement with the first-named wedge behind the flange.

2. In a wheel and demountable tire rim therefor, a fixed felly rim provided with a vertical flange on the inside edge of the rim, wedges on said felly rim inclined both circumferentially and laterally, each of said wedges having a vertical flange on the outside edge thereof, and wedges on the tire rim adapted to be passed with the tire rim laterally onto the felly rim, and then by a circumferential movement of the tire rim to be moved into engagement with the felly rim wedges behind the outside flanges thereof.

3. In a wheel and demountable tire rim therefor, the felly rim and the tire rim, a flange on each side of the felly rim, a wedge on the felly rim between the inside and outside flanges thereof and tapering laterally from one of said flanges to the other, a wedge on the tire rim adapted to be forced with the tire rim laterally onto and over the felly rim, and of a size and shape to pass between the inside and outside felly rim flanges and engage the felly rim wedge when the tire rim is turned circumferentially on the felly rim.

Signed by me at New York city, county and State of New York, this 28th day of January 1909.

ALEXANDER DOW.

Witnesses:
EMMA W. RENNÉ,
F. J. ERWIN.